United States Patent
Wildhaber

(10) Patent No.: US 7,870,931 B2
(45) Date of Patent: Jan. 18, 2011

(54) SOUND-ABSORBING INSULATION ELEMENT WITH STRENGTHENING EMBOSSMENTS

(75) Inventor: Alexander Wildhaber, Sevelen (CH)

(73) Assignee: Rieter Technologies AG, Winterthur (CH)

(*) Notice: Subject to any disclaimer, the term of this patent is extended or adjusted under 35 U.S.C. 154(b) by 80 days.

(21) Appl. No.: 12/162,826

(22) PCT Filed: Feb. 1, 2007

(86) PCT No.: PCT/EP2007/000849

§ 371 (c)(1),
(2), (4) Date: Dec. 29, 2008

(87) PCT Pub. No.: WO2007/088048

PCT Pub. Date: Aug. 9, 2007

(65) Prior Publication Data

US 2009/0301811 A1    Dec. 10, 2009

(30) Foreign Application Priority Data

Feb. 2, 2006   (DE) .................. 20 2006 001 654 U

(51) Int. Cl.
    *E04B 1/82* (2006.01)
    *E04B 1/84* (2006.01)
    *E04B 1/74* (2006.01)
    *E04B 1/88* (2006.01)
    *B21D 28/26* (2006.01)

(52) U.S. Cl. .................. 181/293; 181/204; 296/39.3; 428/596

(58) Field of Classification Search .......... 181/290, 181/204, 293; 296/39.3, 39.1; 228/59; 428/596, 428/597; 442/378, 120
See application file for complete search history.

(56) References Cited

U.S. PATENT DOCUMENTS

| 2,969,586 | A |   | 1/1961  | Victor |
|-----------|---|---|---------|--------|
| 3,279,973 | A | * | 10/1966 | Arne ........................... 428/187 |
| 4,092,842 | A |   | 6/1978  | Oser et al. |
| 4,318,965 | A | * | 3/1982  | Blair .......................... 428/593 |
| 4,401,706 | A | * | 8/1983  | Sovilla ....................... 428/158 |
| 4,463,049 | A | * | 7/1984  | Kracke ....................... 442/120 |
| 5,011,743 | A | * | 4/1991  | Sheridan et al. ............. 428/600 |
| 5,196,253 | A |   | 3/1993  | Mueller et al. |

(Continued)

FOREIGN PATENT DOCUMENTS

DE    10 2005 006 164    9/2005

(Continued)

OTHER PUBLICATIONS

PCT International Search Report for PCT/EP2007/000849, May 21, 2007.

*Primary Examiner*—Edgardo San Martin
(74) *Attorney, Agent, or Firm*—Dority & Manning, P.A.

(57) ABSTRACT

The sound-absorbing insulation element is used everywhere sound and/or heat sources have to be shielded, preferably in automotive engineering as a heat shield. The insulation element comprises at least one studded sheet-shaped element which is provided with strengthening embossments. The strengthening embossments have an embossment base and embossment flanks. According to the invention, the sheet-shaped element exhibits material compression, that is to say material hardening, in the region of the embossment flanks. Fissures which have a bizarrely shaped contour lie in the embossment base. These fissures are produced by the stretching and tearing of the embossment base.

19 Claims, 3 Drawing Sheets

U.S. PATENT DOCUMENTS

| | | | | |
|---|---|---|---|---|
| 5,464,952 A * | 11/1995 | Shah et al. | | 181/211 |
| 5,550,338 A * | 8/1996 | Hielscher | | 181/290 |
| 5,670,264 A * | 9/1997 | Sheridan | | 428/594 |
| 5,767,024 A * | 6/1998 | Anderson et al. | | 442/378 |
| 5,800,905 A * | 9/1998 | Sheridan et al. | | 428/157 |
| 5,958,603 A * | 9/1999 | Ragland et al. | | 428/595 |
| 6,276,044 B1 * | 8/2001 | Ragland et al. | | 29/521 |
| 6,302,466 B1 * | 10/2001 | Zwick | | 296/39.3 |
| 6,352,787 B1 * | 3/2002 | Zwick et al. | | 428/594 |
| 6,398,266 B1 * | 6/2002 | Crump | | 285/226 |
| 6,451,447 B1 * | 9/2002 | Ragland et al. | | 428/593 |
| 6,555,246 B1 | 4/2003 | Zwick | | |
| 6,613,174 B1 * | 9/2003 | Zwick et al. | | 156/209 |
| 6,821,607 B2 * | 11/2004 | Zwick et al. | | 428/172 |
| 6,966,402 B2 * | 11/2005 | Matias et al. | | 181/290 |
| 6,994,902 B2 * | 2/2006 | Fukunaga et al. | | 428/131 |
| 7,445,084 B2 * | 11/2008 | Berbner et al. | | 181/290 |
| 7,585,559 B2 * | 9/2009 | Schroeder et al. | | 428/319.1 |
| 7,677,358 B2 * | 3/2010 | Tocchi et al. | | 181/290 |
| 2004/0247857 A1 * | 12/2004 | Schroeder et al. | | 428/319.1 |
| 2006/0201741 A1 * | 9/2006 | Inoue et al. | | 181/204 |
| 2007/0009726 A1 * | 1/2007 | Wildhaber et al. | | 428/297.4 |
| 2007/0160864 A1 * | 7/2007 | De Ciutiis et al. | | 428/606 |
| 2008/0203751 A1 * | 8/2008 | Wildhaber | | 296/39.3 |

FOREIGN PATENT DOCUMENTS

| | | |
|---|---|---|
| WO | 91/10560 | 7/1991 |
| WO | WO 2005023594 A1 * | 3/2005 |

* cited by examiner

SOUND-ABSORBING INSULATION ELEMENT WITH STRENGTHENING EMBOSSMENTS

FIELD OF THE INVENTION

The present invention relates to a sound-absorbing insulation element. Such insulation elements are used wherever sound sources and/or heat sources must be shielded. Such insulation elements are used especially in automobile construction, for example between a hot catalytic converter and the vehicle floor.

BACKGROUND OF THE INVENTION

Insulation elements are known and are described, for example, in PCT application WO 91/10560, WO 00/46493 and German Patent Publication No. DE 10 2005 006 164 A1.

PCT application WO 91/10560 describes a heat shield with a foil pack which comprises heat-conducting zones (heat sinks) and heat-insulating zones. The individual foils of the foil pack have studs or knobs which lead to the stacked foils being spaced apart from one another. The individual foils may be hermetically sealed to one another, permitting the containment of a gas, for example xenon. In a further development of this heat shield, the individual foils are perforated in order to improve acoustic effectiveness. In practice, the edge regions of such foil packs are pressed together without significant pressure, are cut and then are subsequently flanged, heat-sealed or mechanically connected.

The acoustic effectiveness of such foil packs can be significantly improved if the foil packs have slot-shaped perforations. WO 00/46493 describes an insulation element composed of at least two metallic sheets, for example foils or thin metal sheets. To improve the acoustic effectiveness of the insulation element, at least one of the metallic sheets has studs and fissures. The fissures are formed when the elasticity limit of the metallic sheet is exceeded during formation of the studs. In one preferred embodiment, the individual metallic sheets are cold-welded to one another.

In order to reduce the costs for such insulation elements, steps have been taken to combine the sound-insulating and heat-insulating foils with their associated support structure in order to create a self-supporting insulation element. Self-supporting insulation elements not only have the advantage of cost savings, but such insulation elements are lighter in weight and take up less space.

DE 10 2005 006 164 discloses an insulation element in the form of a studded foil or a studded metal sheet with slot-shaped openings having substantially smooth edges and smooth ends. The openings are formed by first creating material incisions or predetermined breaking points in the raw material by a slot embossing machine, for example a segment slotting device. The material is then subjected to three-dimensional deformation which causes the predetermined breaking points to break, leading to the creation of slot-shaped openings with smooth edges and smooth ends. Unfortunately, it has been found that such insulation elements have a low capacity for sound absorption. Furthermore during their intended use, such insulation elements are subjected to intense vibrations and consequently to intense tensile loading. This results in the tendency for the slot-shaped openings to tear or propagate. Such tearing or propagation also adversely affects the sound absorption properties of the insulation element. In order to prevent tearing or propagation, DE 10 2005 006 164 proposes for the slots to open into circular or elliptical holes at both ends of the slots. This, however, requires a corresponding slot-embossing and hole-punching die, which makes the production of these insulation elements considerably more expensive.

SUMMARY OF THE INVENTION

It is an object of the present invention to create a sound-absorbing insulation element which does not have the above stated disadvantages. More particularly, it is an object of the present invention to create a self supporting and lightweight insulation element which can withstand intended mechanical loadings for long periods of time without degradation of acoustic absorption capacity. Additional objects and advantages of the invention will be set forth in the following description, or may be obvious from the description, or may be learned through practice of the invention.

These objects are achieved by the sound-absorbing insulation element of the present invention. In one embodiment of the present invention, a sound-absorbing heat shield comprises at least one studded sheet-like element having embossments suitable for perforations. The embossments are formed as strengthening embossments which increase the intrinsic stability of the sheet-like element and prevent tearing or propagation of the perforations. The perforations are formed as fissures. The term fissures refers to perforations generated during embossment formation as a result of the stretching and tearing of the embossment base. Such fissures have a corrugated and irregular contour and are known for example from WO 00/46493. It has been found that such fissures with irregular contours have a significantly greater absorption capacity than slot-shaped openings with substantially smooth edges and smooth ends.

In a preferred embodiment of the present invention, the insulation element has zones or areas without strengthening embossments. These zones provide for the stable holding of fastening elements, the inscription of article numbers or brand labels, the processing of, for example, a flanged edge, and to prevent instances of fatigue.

Using the teachings disclosed herein, one of ordinary skill in the art should understand that the strengthening embossments can be of any desired shape. For example, the strengthening embossments may be round, trapezoidal, star-shaped, triangular, rectangular and/or hexagonal. The strengthening embossments preferably have a shape which forms a large base surface to promote randomly-aligned tearing.

In another embodiment, the strengthening embossment has an embossment base with a thickness b at its shoulder. The shoulder of the embossment base refers to the region of the embossment base directly in front of the transition to the embossment flank. The thickness b forms a ratio (b/d) with the thickness d of the sheet-like element of preferably about 1/10. Using the teachings disclosed herein, one of ordinary skill in the art should understand that this ratio (b/d) may also be less than about 1/10. This ratio has proven to be particularly advantageous because it leads to optimum strengthening of the material in the embossment region.

In another exemplary embodiment, the strengthening embossment has a width a which forms a ratio (a/d) with the thickness d of the sheet-like element of preferably about 3/1. This ratio (a/d) has proven to be particularly advantageous.

In another exemplary embodiment, the sheet-like element is composed of a metallic material such as an aluminum or an aluminum alloy. The sheet-like element can also be produced from a plastic or composite material and in particular from a foamed material. An aluminum sheet with a thickness of about 0.3 mm to about 0.5 mm has proven to be particularly advantageous.

In another exemplary embodiment, the fissures do not lie in one particular direction, but rather are aligned randomly. It has proven to be particularly advantageous in acoustic terms for the fissures to be aligned randomly. The random alignment of the fissures promotes the absorption of diffusely incident sound waves.

BRIEF DESCRIPTION OF THE DRAWINGS

A full and enabling disclosure of the present invention, including the best mode thereof, is set forth in the specification, which makes reference to the appended figures, in which.

DETAILED DESCRIPTION OF THE DRAWINGS

Figure 1:
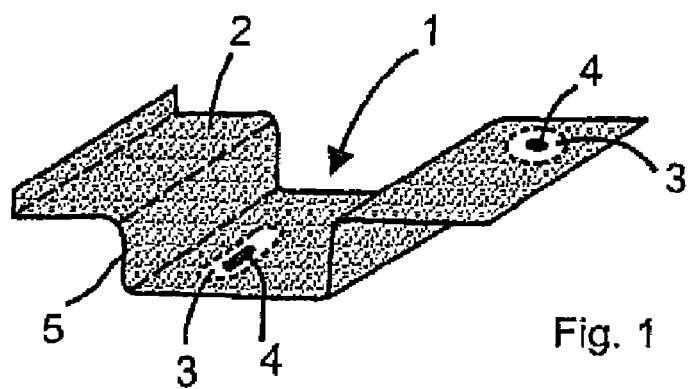
FIG. 1 provides a perspective view of an insulation element.

Reference is now made to embodiments of the invention, examples of which are illustrated in the drawings. FIG. 1 provides a perspective view of an insulation element. The insulation element comprises a sheet 1, with slot-shaped openings 2 which are distributed over the sheet 1. The distribution of the slot-shaped openings 2 falls within the scope of routine trade practice. FIG. 1 depicts perforation-free zones 3 which have fastening holes 4 for holding fastening means. The zones 3 may provide for the inscription of article numbers or brand labels, the processing of, for example, a flanged edge, and may serve to prevent instances of fatigue. The sheet 1 may also include beads 5 in order to further increase its mechanical stability.

The insulation element preferably comprises a non-corrosive sheet 1 composed of aluminum. The aluminum sheet preferably has a thickness of about 0.3 mm to about 0.5 mm. The sheet may also be composed of an aluminum foil with a thickness of, for example, about 0.1 mm to about 0.3 mm or of a thick aluminum sheet with a thickness of for example about 0.5 mm to about 5 mm. It is also possible to use other metals to produce the sheet 1 such as for example copper, zinc or other suitable alloys. It is even possible to use plastics such as thermoplastics, foams or foils to produce the sheet 1. It is irrelevant whether the material used is soft or brittle. The material must merely be suitable for the formation of studs.

Figure 2:
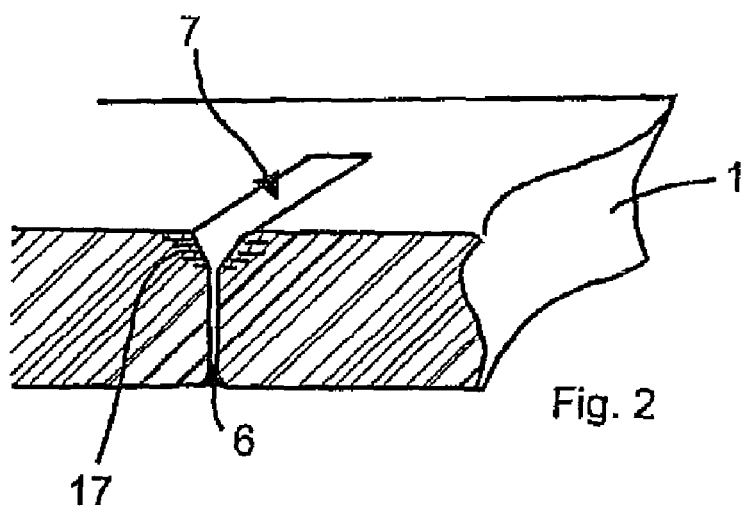
FIG. 2 provides an illustration of an insulation element with a known slot-shaped opening.

FIG. 2 provides an illustration of an insulation element with a known slot-shaped opening. To generate the gap 6, the material is first marked or notched and then broken. FIG. 2 depicts a notch 7, with a prismatic shape. A certain degree of compression 17 of the material can be seen along the edge of the notch 7. The ratio of the notch depth to the thickness of the material is very small, for example less than about 1:2.

Figure 3:
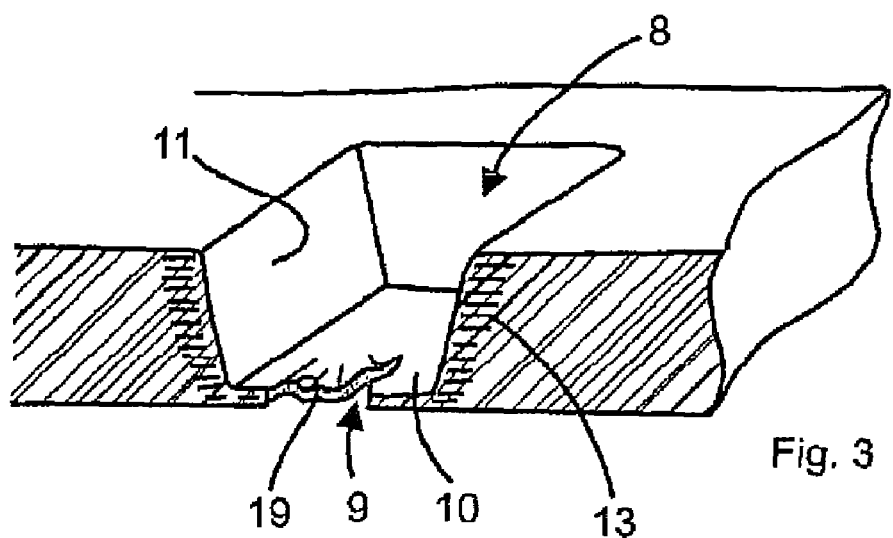
FIG. 3 provides a perspective view of an individual strengthening embossment according to an exemplary embodiment of the present invention.

FIG. 3 provides a perspective view of an individual strengthening embossment according to an exemplary embodiment of the present invention. Using the teachings disclosed herein, one of ordinary skill in the art should appreciate that it is possible to use other strengthening embossment shapes than of the type depicted in FIG. 3. The strengthening embossment shape may in particular have a round, triangular, rectangular, trapezoidal, hexagonal, star-shaped or other desired shape. It is not necessary for the strengthening embossment 8 to taper downwards in cross section, as is shown in FIG. 3. It is also possible to produce sheets 1 which either have a uniform strengthening embossment shape, or locally different strengthening embossment shapes. FIG. 3 depicts fissure 9 in the embossment base 10. The fissure 9 has a bizarre contour 19.

Figure 4:
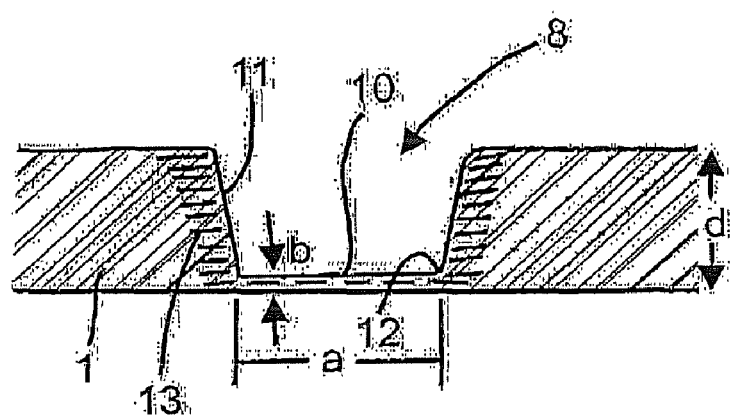
FIG. 4 provides a cross-sectional view of an individual strengthening embossment according to an exemplary embodiment of the present invention without a fissure.

FIG. 4 provides a cross-sectional view of an individual strengthening embossment according to an exemplary embodiment of the present invention without a fissure. The strengthening embossment 8 has an embossment base 10 and side flanks 11. The embossment base 10 has a thickness b that is thinner than the thickness d of the sheet-like element 1, with the ratio b/d at the shoulder 12 (transition from side flank 11 to embossment base 10) preferably being 1:10 or less. The ratio between the width a of an embossment base 10 and the thickness b of the embossment base is preferably 3:1 or greater. The strengthening embossment 8 has intense local hardening or strengthening 13 in the flank region 11 and in particular in the embossment base region 10. The strengthening embossments contribute to the stiffening of the entire sheet 1.

Figure 5:
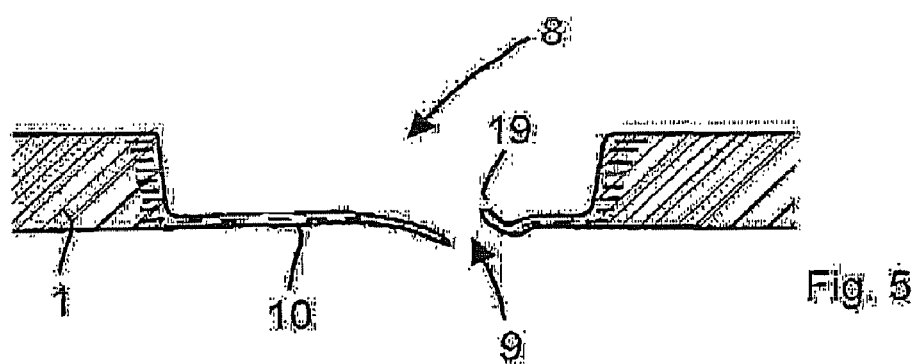
FIG. 5 provides a cross-sectional view of an individual strengthening embossment according to an exemplary embodiment of the present invention with a fissure.

FIG. 5 provides a cross-sectional view of an individual strengthening embossment 8 according to an exemplary embodiment of the invention with a fissure 9 in the embossment base 10. The bizarre contour 19 is generated by the stretching and tearing of the embossment base 10. The bizarre contour 19 generally has corrugated warping and an irregularly jagged profile.

Figure 6:
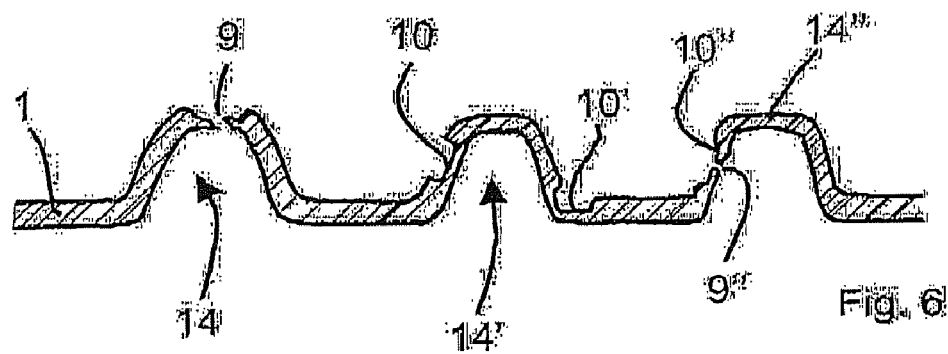
FIG. 6 provides a cross-sectional view of a studded insulation element according to an exemplary embodiment of the invention with a strengthening embossment and fissures.

FIG. 6 provides a partial cross-sectional view of sheet I with studs 14 and strengthening embossments 10. FIG. 6 illustrates that not all of the embossment bases 10, 10', 10" are torn open. Some of said embossment bases 10" are torn open and have fissures 9, 9", while other embossment bases 10, 10' are merely stretched or deformed and have no fissures.

The fissures 9 have at least 10% better sound absorption in the high-frequency range, and at least 5% better sound absorption in the mid-frequency range (speech range), than openings with substantially smooth edges and smooth openings.

The insulation element according to the present invention is preferably composed of a single metal sheet. However, the insulation element may also comprise a plurality of metal sheets. For example, using the teachings disclosed herein, all combinations of sheets according to exemplary embodiments of the present invention with metal sheets known in the art are conceivable. For example, it is possible for sheets constructed according to exemplary embodiments of the present invention to be combined with non-studded, non-fissured foils or metal sheets which do not have strengthening embossments. Such foil and/or metal-sheet packs are preferably cut to be sized together and/or cold-welded to produce a sound-absorbing insulation element, such as a sound-absorbing heat shield for motor vehicles.

Figure 7:
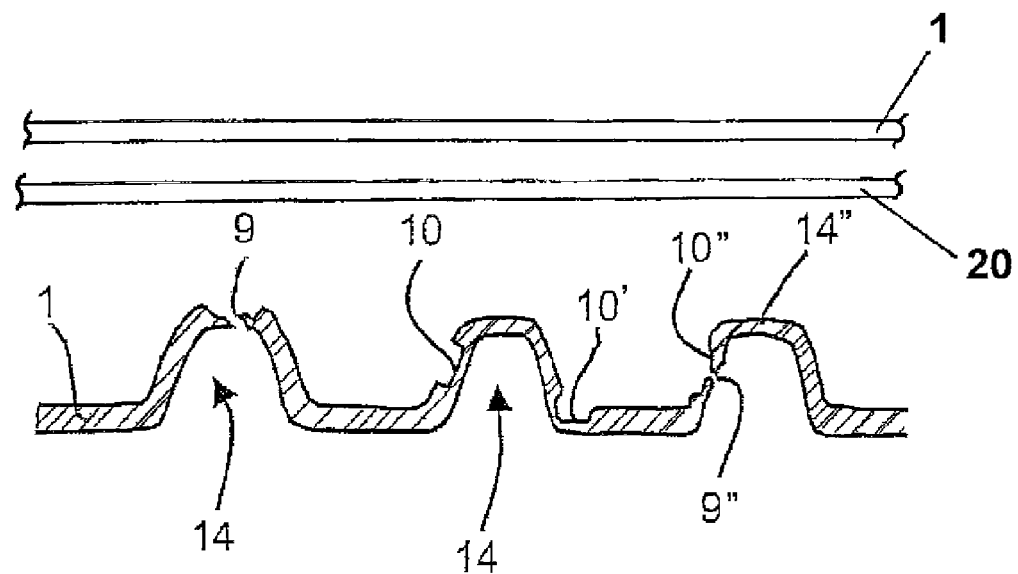
FIG. 7 provides a cross-sectional view of a studded insulation element according to an exemplary embodiment of the invention with a strengthening embossment and fissures.

In another embodiment of the insulation element according to the present invention shown in FIG. 7, the insulation element has two sheet-like elements 1 and organic and/or inorganic heat-insulating and/or sound insulating materials 20 with an airflow resistance of 500 to 5000 Ns/m³ are partially arranged in the intermediate space between the two elements 1. The intermediate space may also be formed by a sheet provided with fissures and a sheet without fissure, with organic and/or inorganic heat-insulating and/or sound-insulating materials with an airflow resistance of 500 to 5000 Ns/m$^3$ being partially arranged in the intermediate space of the two sheets. It is self-evident that organic and/or inorganic heat-absorbing and/or sound absorbing materials with a different thickness or density and sequence may be arranged one above the other in the intermediate space of the two sheets. The organic and/or inorganic heat-absorbing and/or sound absorbing material 20, in particular nonwovens, fabrics, films, etc. may be arranged spaced apart from the individual sheets. One simple embodiment has, in the intermediate space between two sheets, an air space which differs locally in height from 1 to 50 mm.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A sound-absorbing insulation element, comprising:
   a sheet having a plurality of studs and at least one of the studs having at least one strengthening embossment,
   the at least one strengthening embossment defining an embossment base and embossment flanks; and
   a perforation located on the embossment base, the perforation being a fissure with irregular contours.

2. The insulation element of claim 1, wherein the insulation element has a zone without strengthening embossments.

3. The insulation element of claim 1, wherein the strengthening embossment is round.

4. The insulation element of claim 1, wherein the strengthening embossment is rectangular.

5. The insulation element of claim 1, wherein the strengthening embossment is hexagonal.

6. The insulation element of claim 1, wherein the strengthening embossment is triangular.

7. The insulation element of claim 1, wherein the strengthening embossment is trapezoidal.

8. The insulation element of claim 1, wherein the strengthening embossment is star-shaped.

9. The insulation element of claim 1, wherein the embossment base has a thickness b and the sheet has a thickness d, the ratio b/d being less than or equal to about 1/10.

10. The insulation element of claim 1, wherein the strengthening embossment further defines a width a and the sheet has a thickness d, the ratio a/d being greater than or equal to about 3/1.

11. The insulation element of claim 1, wherein the insulation element is formed of a metallic material.

12. The insulation element of claim 1, wherein the insulation element is formed of a plastic material.

13. The insulation element of claim 1, wherein the insulation element is formed of a composite material comprising a metallic material and a plastic material.

14. The insulation element of claim 1, wherein the studded sheet comprises an aluminum sheet having a thickness of about 0.3 mm to about 0.5 mm.

15. The insulation element of claim 1, wherein the sheet has a plurality of strengthening embossments and a plurality of fissures situated within the strengthening embossments, the plurality of fissures being randomly aligned.

16. A sound absorbing insulation element, the sound absorbing insulation element comprising two opposing sheets, wherein at least one of the two opposing sheets has a plurality of studs and at least one of the studs having at least one strengthening embossment, the at least one strengthening embossment defining an embossment base and embossment flanks, and a perforation located on the embossment base, the perforation being a fissure with irregular contours.

17. The sound absorbing insulation element of claim 16, wherein the insulation element further comprises insulating materials between the two opposing sheets.

18. The sound absorbing insulation element of claim 17, wherein the insulating material have an airflow resistance of 500 to 5000 Ns/m$^3$.

19. The sound absorbing insulation element of claim 16, wherein an airspace is located between the two opposing sheets.

* * * * *